J. D. HARRISON, Dec'd.

B. HARRISON, (widow) W. S. MARSHALL & S. GOLDEN, (Guardians of minor children) assignors to FARMERS' FRIEND MANUFACTURING CO.

Seeding-Machine.

No. 8,394. Reissued Sept. 3, 1878.

Inventor

Farmers Friend Mfg. Co
assignee
by Wood & Boyd
Attorneys

Attest
Charles C. Wilson
C. M. Gallagher

N. PETERS, PHOTO-LITHOGRAPHER, WASHINGTON, D. C.

UNITED STATES PATENT OFFICE.

FARMERS FRIEND MANUFACTURING COMPANY, OF DAYTON, OHIO, ASSIGNEE OF BARBARA HARRISON, WIDOW OF JNO. D. HARRISON, DECEASED, AND WM. S. MARSHALL AND SIMON GOLDEN, GUARDIANS OF MINOR CHILDREN OF SAID JOHN D. HARRISON.

IMPROVEMENT IN SEEDING-MACHINES.

Specification forming part of Letters Patent No. 93,989, dated August 24, 1869; Reissue No. 8,394, dated September 3, 1878; application filed June 20, 1878.

*To all whom it may concern:*

Be it known that JOHN D. HARRISON, of Middletown, in the county of Butler, in the State of Ohio, did invent a new and useful Improvement in Seeding-Machines; and I do hereby declare that the following is a full and exact description thereof, reference being had to the accompanying drawings and to the letters of reference marked thereon.

Figure 1:
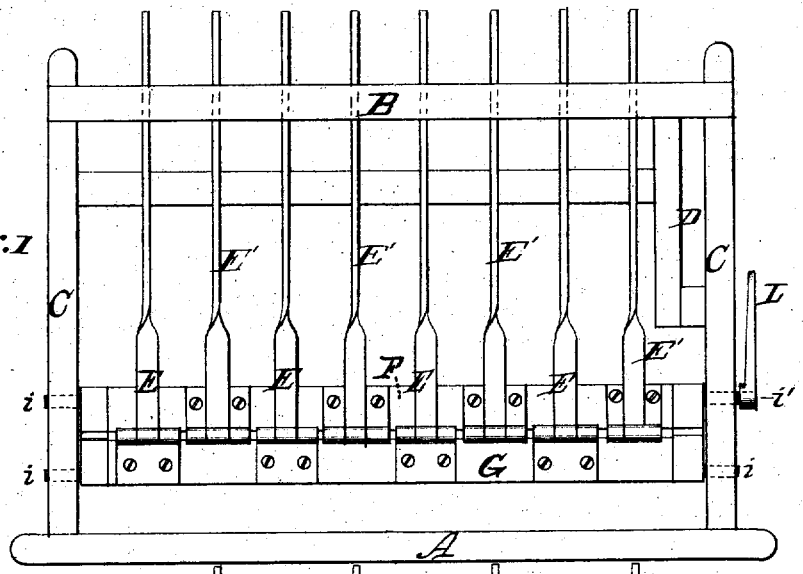
Figure 2:
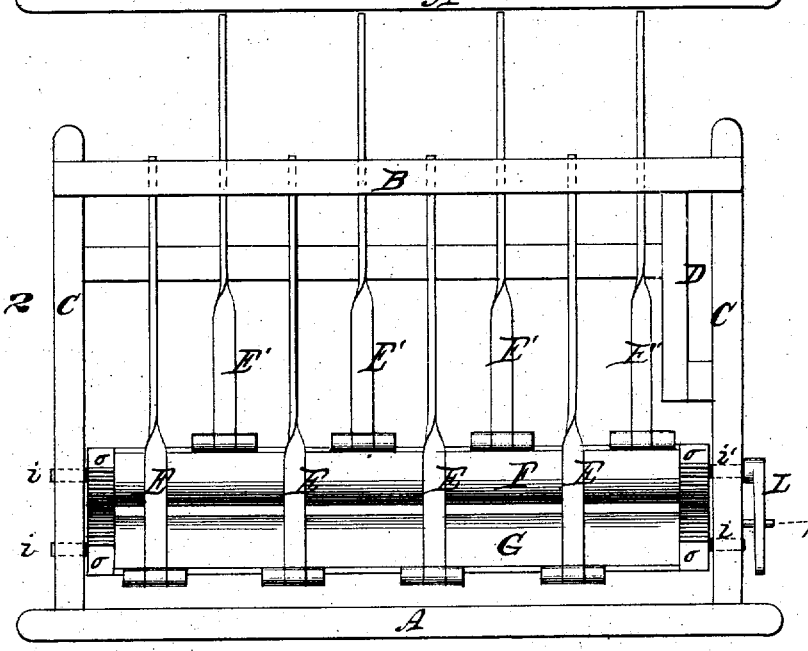
Figure 3:
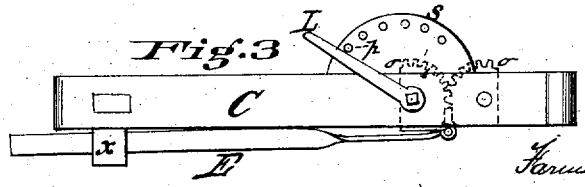

Figure 1 represents the under side of a portion of the frame-work of a seeding-machine, with the drag-bars and their adjusting mechanism. Fig. 2 represents the under side of the same, with the drag-bars in double ranks. Fig. 3 represents an end view of the frame, drag-bar, and adjusting mechanism.

The object of the invention is to provide a simple and efficient means of adjusting the drag-bars and hoes to which they are to be connected, so that the hoes may be formed in single or double ranks, as herein fully described.

A B C denote the frame, and the narrow space D is formed to admit the wheel, which would actuate an agitator in a seed-box, in the usual manner. The drag-bars E E′, to which hoes are attached in a complete machine, are respectively hinged to the two adjusting-bars F G, as represented in Figs. 1 and 2.

The ends of the bars F G are preferably provided with quadrant-shaped metal sockets, having segmental gearing and journals, as represented in dotted lines in Fig. 3. The journals *i* have their boxes in the frame-pieces *c c*, and occupy a proper relation to each other to bring the segmental gearing upon the sockets *o* into mesh at each side of the machine. One of the journals, *i′*, extends out beyond the frame to receive a hand-lever, L, by which an attendant may adjust the rollers or bars F G. The alternate drag-bars E are hinged to the bar G. The alternate series E′ are hinged to the bar F, as clearly represented in Fig. 2. The bars E will remain in any position to which they are adjusted without the aid of the pin *p* in the block *s*, because the draft, in propelling the machine with the hoes attached to the drag-bars, is sustained by the hinged connections equally by the bars E and G, which are adjusted upon their axes in opposite directions.

In clean fine soil the drag-bars will be adjusted by lever L to occupy a single rank, and consequently the hoes, through which the seed will be conducted to the ground, will also occupy a similar position; but, in weedy or cloggy ground the hoes should be adjusted to the double ranks, as then the clogs and weeds may freely escape between them.

I am aware that various devices have been employed to effect this object; but by my invention I dispense with much of the mechanism heretofore employed, and actuate the bars to which the drag-bars are attached directly without the interposition of an additional longitudinal connecting-bar. The frame-piece *x* will be removed when the drag-bars are hinged to their respective hoes in the working machine.

The same operation secured by the two rotary bars F G may be produced by one rotary bar and one sliding bar when the two are connected together in a proper manner.

What is claimed is—

1. In a grain-drill, the bar G, pivoted to the main frame, having only the alternate drag-bars E attached to it, whereby the alternate drag-bars E are adjusted forward and backward by the oscillation of the pivoted bar G, substantially as herein set forth.

2. In a grain-drill, the bar F, pivoted to the main frame, and having only alternate drag-bars hinged to it, so that the oscillations of bar F on its pivot adjusts the alternate series of bars E′ backward or forward, substantially as herein set forth.

3. In a grain-drill, two oscillating bars, separately pivoted to the main frame, with a series of drag-bars alternately hinged to each bar, which are adjusted to occupy either a single or a double rank by the oscillation of the bars on their axes, substantially as herein set forth.

4. In a grain-drill, the series of drag-bars, hinged alternately to two bars separately pivoted to the main frame, and so connected that the oscillation of one of the adjusting-bars will move the other and set the two series of drag-bars in either single or double rank, substantially as herein set forth.

5. The combination of the gearing-sockets *o* with the bars F G and drag-bars E, constructed, arranged, and operated substantially as and for the purpose described.

FARMERS FRIEND M'F'G CO.,
By BENJAMIN KUHNS, *President.*

Attest:
C. M. GALAGHER,
EDWARD BOYD.